Patented Oct. 6, 1931

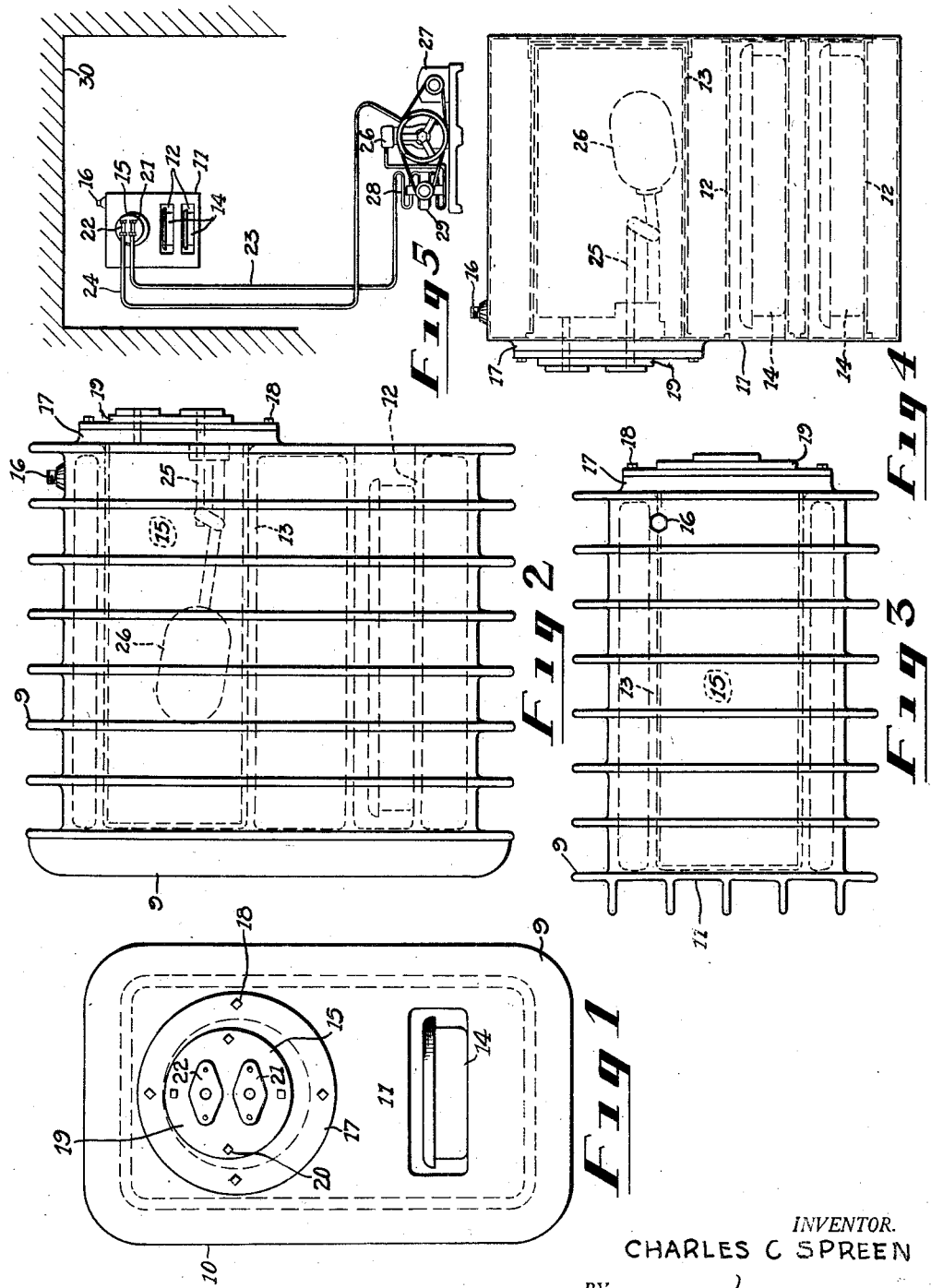

1,826,374

UNITED STATES PATENT OFFICE

CHARLES C. SPREEN, OF DETROIT, MICHIGAN, ASSIGNOR TO KELVINATOR CORPORATION, OF DETROIT, MICHIGAN, A CORPORATION OF MICHIGAN

REFRIGERATION

Application filed February 21, 1927. Serial No. 169,759.

This invention relates to refrigerating apparatus and more particularly to improvements in the construction and arrangement of the elements of a refrigerant cooling unit. It has for its principal object the provision of a cooling unit comprising a heat absorber adapted to have associated in intimate thermal contact therewith a removable refrigerant vaporizer.

Heretofore cooling units employing heat absorbers in combination with refrigerant vaporizers have been constructed as an integral unit. Where brine tanks were used as the heat absorber the vaporizer was usually positioned within the tank and indirect contact with the brine. This type of construction generally necessitated the transportation of the complete cooling unit to a repair shop when the removal of the vaporizer was required for the purposes of replacing or repairing it. Even in a repair shop considerable inconvenience attended the removal of the vaporizer, as unless the brine was previously drained from the tank, it overflowed when the vaporizer was removed. The varied application of refrigerating equipment requires a cooling unit which may be quickly repaired and which is constructed from parts which are readily interchangeable. This invention accordingly provides a cooling unit comprising a heat absorber and a refrigerant vaporizer adapted to be removably associated therewith.

In the drawings:

Figure 1 is a front elevation of one embodiment of the invention;

Figure 2 is a side elevation of the structure illustrated in Figure 1;

Figure 3 is a plan view of the structure illustrated in Figures 1 and 2;

Figure 4 is a side elevation of an alternative embodiment of the invention; and

Figure 5 is a front elevation of the structure shown in Figure 4 positioned within a refrigerator cabinet and operatively connected to a refrigerant condensing unit.

The cooling unit 10 embodying this invention comprises a brine tank 11, provided with recesses 12 and 13 adapted to receive a removable freezing tray 14 and a removable refrigerant vaporizer 15. As illustrated in Figures 1, 2 and 3, the brine tank 11 comprises a substantially rectangular chamber formed of cast metal having a plurality of fins 9 cast into its exterior wall. The brine tank is cast with the walls of the interiorly disposed recesses 12 and 13 forming a continuation of the outer wall thereof. An opening is provided in the exterior wall of the brine tank 11 providing access to the interior thereof whereby brine or other suitable holdover medium may be introduced into the tank. This opening is provided with a closure member 16 adapted to prevent loss of brine through overflow or evaporation. The brine contained within the tank 11 surrounds the recesses 12 and 13. The recess 12 is preferably positioned below the recess 13 in order that colder brine, which tends to settle to the lower part of the brine tank, will circulate thereabout and promote quicker freezing of the contents of the freezing tray 14.

The vaporizer 15 is adapted to fit snugly into the recess 13 with its exterior walls contacting the inner walls of the recess substantially throughout the entire extent of the latter. The walls of the recess 13 and the vaporizer 15 are formed of metal of good thermal conductivity. Heat is accordingly transferred readily from the brine solution through the walls of the recess and the vaporizer to the refrigerant contained within the vaporizer.

The vaporizer 15 is provided with a head 17 rigidly secured to the body portion thereof. The vaporizer may if desired be secured within the recess 13 by means of bolts 18 projecting through the head 17 and threaded into openings provided in the exterior wall of the tank 11. The head 17 is provided with an opening adapted to be closed by a removable closure 19. The closure 19 is secured in position by means of stud bolts 20. It is provided with openings therethrough for the admission of refrigerant to the header and the withdrawal of refrigerant therefrom. Couplings 21 and 22 associated with the closure 19 adjacent the openings therein provide means for securing a liquid line 23 and a suction line 24 thereto. The opening in the closure 19 through which refrigerant is admitted to the vaporizer is adapted to be closed by a needle valve 25. A float 26 is associated with the needle valve for controlling the operation thereof. The float 26 and needle valve 25 are adjusted to permit refrigerant to flow into the vaporizer until a predetermined level is reached therein, whereupon the needle valve closes the opening. As the refrigerant within the vaporizer is evaporated the float 26 lowers with the liquid level and more liquid refrigerant is permitted to enter through the opening. In this manner a constant quantity of liquid refrigerant is maintained within the vaporizer.

The cooling unit illustrated in Figures 4 and 5 comprises a sheet metal brine tank 11 having a plurality of interiorly disposed recesses 12 and 13. Freezing trays 14 are removably disposed within the recesses 12 and a vaporizer 15 is removably positioned within the recess 13. This modification has no fins on its exterior surface and the recesses 12 and 13 are formed as sheet metal receptacles separately from the brine tank and inserted into openings in a wall of the tank provided for that purpose. A fluid tight connection is made between the outer extremities of the recesses and the wall of the brine tank adjacent thereto. The walls of the recess accordingly form a substantial continuation of the outer wall of the brine tank. The recesses are spaced suitably from the side walls of the tank and from each other to permit the circulation of brine thereabout. While the brine tank illustrated in Figures 4 and 5 is provided with but two recesses for the reception of freezing trays, it should be understood that any desired number of recesses for this purpose may be provided in the brine tank.

The cooling unit illustrated in Figure 5 is a front elevation of the structure shown in Figure 4. It is shown positioned within the cooling compartment of a refrigerator cabinet 30. The refrigerant conduits 23 and 24 are operatively connected to the vaporizer. Vaporized refrigerant is withdrawn from the vaporizer 15 by means of the action of a compressor 26. Motive power is supplied to the compressor by means of an electric motor 27. After the vaporized refrigerant is withdrawn from the vaporizer and compressed in the compressor, it is discharged into a condenser 28 where it again becomes available for use in the vaporizer which is connected directly with the condenser by means of the conduit 23. Cooling air is passed over the condenser by means of a fan 29 operatively connected to the motor 27. The operation of the motor 27 is controlled by any conventional controller.

From the foregoing description it will be apparent that the vaporizer 15 may be readily inserted into or removed from the recess in the brine tank 11 without disconnecting the refrigerant pipes 23 and 24. When the vaporizer is removed the brine tank is undisturbed and continues to perform its cooling function until the temperature of the brine becomes equal to the temperature of the surrounding medium. The same vaporizer may be replaced in the recess 13 or if desirable another vaporizer of the same size may be used.

While the drawings and description herein have been limited to a cooling unit comprising a removable vaporizer associated with a brine tank as a heat absorber, it should be understood that the invention contemplates the use of a removable vaporizer with any type of suitable heat absorber.

I claim:

1. A refrigerant cooling unit comprising a heat absorbing means having a recess formed interiorly thereof, the walls of the recess forming a continuation of the outer wall of the heat absorbing means, a refrigerant vaporizer disposed within the recess, the exterior walls of the vaporizer contacting intimately with the walls of the recess, means for controlling the admission of refrigerant to the vaporizer, and conduits operatively associated with the vaporizer for supplying refrigerant thereto and withdrawing refrigerant therefrom, said vaporizer being removable from the recess while operatively connected to the refrigerant conduits.

2. A refrigerant cooling unit comprising a heat absorbing means having a recess formed interiorly thereof, a refrigerant vaporizer disposed within the recess, the exterior walls of the vaporizer contacting intimately with the walls of the recess, means for controlling the admission of refrigerant to the vaporizer, and conduits operatively associated with the vaporizer for supplying refrigerant thereto and withdrawing refrigerant therefrom, said vaporizer being removable from the recess while operatively connected to the refrigerant conduits.

3. A refrigerant cooling unit comprising a heat absorbing means having a recess formed therein, the walls of the recess being constructed of material of good thermal conductivity, a refrigerant vaporizer disposed within the recess, the exterior walls of the vaporizer abutting the interior walls of the recess substantially throughout the entire extent of the latter, means for controlling the admission of refrigerant to the vaporizer, and conduits operatively associated with the vaporizer for supplying refrigerant thereto and withdrawing refrigerant therefrom, said vaporizer being removable from the recess while operatively connected to the refrigerant conduits.

4. A refrigerating apparatus comprising a compartment to be cooled, heat absorbing means in heat exchange relation with the compartment, a chamber forming a part of the heat absorbing means, a refrigerant vaporizer disposed within the chamber and thermally contacting the walls thereof, refrigerant conduits connected to the vaporizer, and means for controlling the admission of refrigerant to the vaporizer, said vaporizer being removable from the chamber while operatively connected to the refrigerant conduits.

5. A refrigerating apparatus comprising a compartment to be cooled, heat absorbing means in heat exchange relation with the compartment, a chamber formed as a part of the heat absorbing means, a refrigerant vaporizer removably disposed within the chamber, the walls of the vaporizer contacting the walls of the chamber substantially throughout the entire extent of the latter, refrigerant conduits operatively connected to the vaporizer, and means for controlling the admission of refrigerant to the vaporizer.

6. A refrigerant expansion unit comprising a hollow receptacle containing a brine solution, an interiorly disposed compartment formed in said receptacle in open communication with the exterior thereof, said compartment having a solid wall of substantial area in thermal contact with said brine solution, and a refrigerant expansion chamber removably disposed in said compartment, the exterior walls of said chamber abutting the interior walls of said compartment throughout substantially the entire extent of the latter.

7. A refrigerant expansion unit comprising a hollow receptacle containing a brine solution, an interiorly disposed compartment formed in said receptacle in open communication with the exterior thereof, said compartment having a solid wall of substantial area in thermal contact with said brine solution, a refrigerant expansion chamber removably disposed in said compartment, the exterior walls of said chamber abutting the interior walls of said compartment throughout substantially the entire extent of the latter, and a second compartment formed interiorly of said receptacle for receiving an ice freezing tray.

8. A refrigerant expansion unit comprising a hollow receptacle containing a brine solution, said receptacle being provided exteriorly with thermal conductive fins, an interiorly disposed compartment formed in said receptacle in open communication with the exterior thereof, said compartment having a solid wall of substantial area in thermal contact with said brine solution, and a refrigerant expansion chamber removably disposed in said compartment, the exterior of said chamber abutting the interior walls of said compartment throughout substantially the entire extent of the latter.

9. A refrigerant expansion unit comprising a hollow receptacle containing a brine solution, an interiorly disposed compartment formed in said receptacle in open communication with the exterior thereof, said compartment having a solid wall of substantial area in thermal contact with said brine solution, and a refrigerant expansion chamber removably disposed in intimate thermal contact with the interior of said compartment and carrying a head adapted to be secured to the exterior walls of said receptacle about the opening of said compartment.

10. A refrigerating apparatus comprising a compartment to be cooled, a heat absorbing device in heat exchanging relation with the compartment, a wall of said heat absorbing device defining a chamber adapted to receive a refrigerant vaporizer, and a refrigerant vaporizer removably disposed within the chamber in good thermal contact with the heat absorbing device.

In testimony whereof I hereunto affix my signature.

CHARLES C. SPREEN.